(12) United States Patent
Alavandar et al.

(10) Patent No.: US 10,044,823 B2
(45) Date of Patent: *Aug. 7, 2018

(54) SOCIAL CONTENT AGGREGATION

(71) Applicant: INTERNATIONAL BUSINESS MACHINES CORPORATION, Armonk, NY (US)

(72) Inventors: Narayanan Alavandar, Bangalore (IN); Ravi S. Arunachalam, Bangalore (IN); Navjot S. Bhogal, Bangalore (IN); Chandan Mukherjee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,075

(22) Filed: Nov. 3, 2017

(65) Prior Publication Data

US 2018/0054496 A1 Feb. 22, 2018

Related U.S. Application Data

(63) Continuation of application No. 14/658,426, filed on Mar. 16, 2015.

(51) Int. Cl.
```
G06Q 30/02    (2012.01)
G06Q 50/00    (2012.01)
G06F 17/30    (2006.01)
G06F 15/16    (2006.01)
H04L 29/08    (2006.01)
```
(52) U.S. Cl.
CPC ............ *H04L 67/22* (2013.01); *G06Q 30/02* (2013.01); *G06Q 50/01* (2013.01); *G06Q 30/0201* (2013.01); *G06Q 30/0269* (2013.01); *H04L 67/306* (2013.01)

(58) Field of Classification Search
CPC .... G06Q 30/02; G06Q 50/01; G06Q 30/0201; H04L 67/02
See application file for complete search history.

(56) References Cited

U.S. PATENT DOCUMENTS

2008/0194233 A1  8/2008 Henry
2009/0055398 A1  2/2009 Zhu et al.
(Continued)

OTHER PUBLICATIONS

Collaboration Products & Solutions; Jive Software; Retrieved from the Internet http://www.jivesoftware.com/social-business-software; 3 pages.
(Continued)

*Primary Examiner* — Nicholas R Taylor
*Assistant Examiner* — Ho T Shiu
(74) *Attorney, Agent, or Firm* — Schmeiser, Olsen & Watts; John Pivnichny

(57) ABSTRACT

A method and system for delivering a service is provided. The method includes enabling a social application container computer system from an end user device, via an application program interface (API) executing in the social application container computer system invoked by an application running on the end user device. Transaction data describing a transaction request of a user of the end user device is collected from the end user device via the application and the API. Transaction specific context is generated based on the transaction data. User specific context is generated based on user data present in the transaction data.

15 Claims, 5 Drawing Sheets

(56) References Cited

U.S. PATENT DOCUMENTS

| | | |
|---|---|---|
| 2009/0265236 A1 | 10/2009 | Schultz et al. |
| 2013/0073336 A1 | 3/2013 | Heath |
| 2013/0304818 A1 | 11/2013 | Brumleve et al. |
| 2014/0136332 A1 | 5/2014 | Amit et al. |
| 2015/0025981 A1 | 1/2015 | Zaretsky et al. |
| 2015/0100377 A1 | 4/2015 | Penumaka et al. |
| 2016/0269343 A1 | 9/2016 | Li et al. |
| 2016/0277517 A1 | 9/2016 | Alavandar et al. |

OTHER PUBLICATIONS

The social network for work; Retrieved from the Internet http://www.tibbr.com; retrieved on Oct. 22, 2014; 4 pages.

Tucci, Linda; Business and social network apps belong together: Will they ever meet? Retrieved from the Internet http://searchcio.techtarget.com/opinion/Business-and-social-ntwork-apps-belong-togehter-Will-they-ever-meet; retrieved on Oct. 22, 2014; 6 pages.

Friedman, Mark J.; List of IBM Patents or Patent Applications Treated as Related; Nov. 3, 2017; 1 page.

SOCIAL CONTENT AGGREGATION

This application is a continuation application claiming priority to Ser. No. 14/658,426 filed Apr. 13, 2015.

FIELD

The present invention relates generally to a method for aggregating social content and in particular to a method and associated system for associating the aggregated social content with an application programming interface (API) service container to differentiate each output.

BACKGROUND

Social business processes are transforming user communications and business transactions. Social business Web API usage is increasing in numbers. Additional, service providers are required to provide services pertinent to social context associated with accessing transactions.

Social context (i.e., when accessing a business service) may include multiple additional useful parameters that may be used by a service provider to provide relevant and differentiated responses to a service consumer. The parameters may include: a geo-location of a consumer, social browsing patterns/behavior of service consumer mobility patterns, social influence of a service consumer, social interests of a service consumer, social relations of a service consumer that is of interest to the service provider, special occasions of a service consumer, social mood of a service consumer, a relationship of a service consumer with respect to a service providing organization, etc.

Social context comprises an ever changing state of information. Currently, application and API developers enable individual invocations from their code to gather and mash up a user's social context from different social or enterprise endpoints. Typical application and API containers do not provide a framework to identify and present social context of a user's session to a developer.

Accordingly, there exists a need in the art to overcome at least some of the deficiencies and limitations described herein above.

SUMMARY

A first aspect of the invention provides a service delivery method comprising: enabling, a computer processor of a social application container computer system from an end user device, via an application program interface (API) executing in the social application container computer system invoked by an application running on the end user device; collecting, by the computer processor from the end user device via the application and the API, transaction data describing a transaction request of a user of the end user device; generating, by the computer processor based on the transaction data, transaction specific context, wherein the generating the transaction specific context comprises: invoking a preconfigured set of external provider services; and assimilating responses of the preconfigured set of external provider services into the transaction specific context; and generating, by the computer processor based on user data present in the transaction data, user specific context, wherein the generating the user specific context comprises: invoking a preconfigured set of external social analytics provider services; assimilating responses of the preconfigured set of external social analytics provider services into the user specific context; and storing retrieved user specific context for future retrieval during an invocation process of the API by the user; combining the user specific context with the transaction specific context, wherein results of the combining generate social context data associated with the invocation process; and transmitting the social context to a social application container of a provider of the API.

A second aspect of the invention provides a social application container computing system comprising a computer processor coupled to a computer-readable memory unit, the memory unit comprising instructions that when executed by the computer processor implements a service delivery method comprising: enabling, the computer processor from an end user device, via an application program interface (API) executing in the social application container computer system invoked by an application running on the end user device; collecting, by the computer processor from the end user device via the application and the API, transaction data describing a transaction request of a user of the end user device; generating, by the computer processor based on the transaction data, transaction specific context, wherein the generating the transaction specific context comprises: invoking a preconfigured set of external provider services; and assimilating responses of the preconfigured set of external provider services into the transaction specific context; and generating, by the computer processor based on user data present in the transaction data, user specific context, wherein the generating the user specific context comprises: invoking a preconfigured set of external social analytics provider services; assimilating responses of the preconfigured set of external social analytics provider services into the user specific context; and storing retrieved user specific context for future retrieval during an invocation process of the API by the user; combining the user specific context with the transaction specific context, wherein results of the combining generate social context data associated with the invocation process; and transmitting the social context to a social application container of a provider of the API.

A third aspect of the invention provides a computer program product, comprising a computer readable hardware storage device storing a computer readable program code, the computer readable program code comprising an algorithm that when executed by a computer processor of a social application container computing system implements a service delivery method, the method comprising: enabling, the computer processor from an end user device, via an application program interface (API) executing in the social application container computer system invoked by an application running on the end user device; collecting, by the computer processor from the end user device via the application and the API, transaction data describing a transaction request of a user of the end user device; generating, by the computer processor based on the transaction data, transaction specific context, wherein the generating the transaction specific context comprises: invoking a preconfigured set of external provider services; and assimilating responses of the preconfigured set of external provider services into the transaction specific context; and generating, by the computer processor based on user data present in the transaction data, user specific context, wherein the generating the user specific context comprises: invoking a preconfigured set of external social analytics provider services; assimilating responses of the preconfigured set of external social analytics provider services into the user specific context; and storing retrieved user specific context for future retrieval during an invocation process of the API by the user; combining the user specific context with the transaction specific context, wherein results of the combining generate social context data associated with the invocation process; and transmitting the social context to a social application container of a provider of the API.

The present invention advantageously provides a simple method and associated system capable of transforming user communications and business transactions.

DETAILED DESCRIPTION

Figure 1:
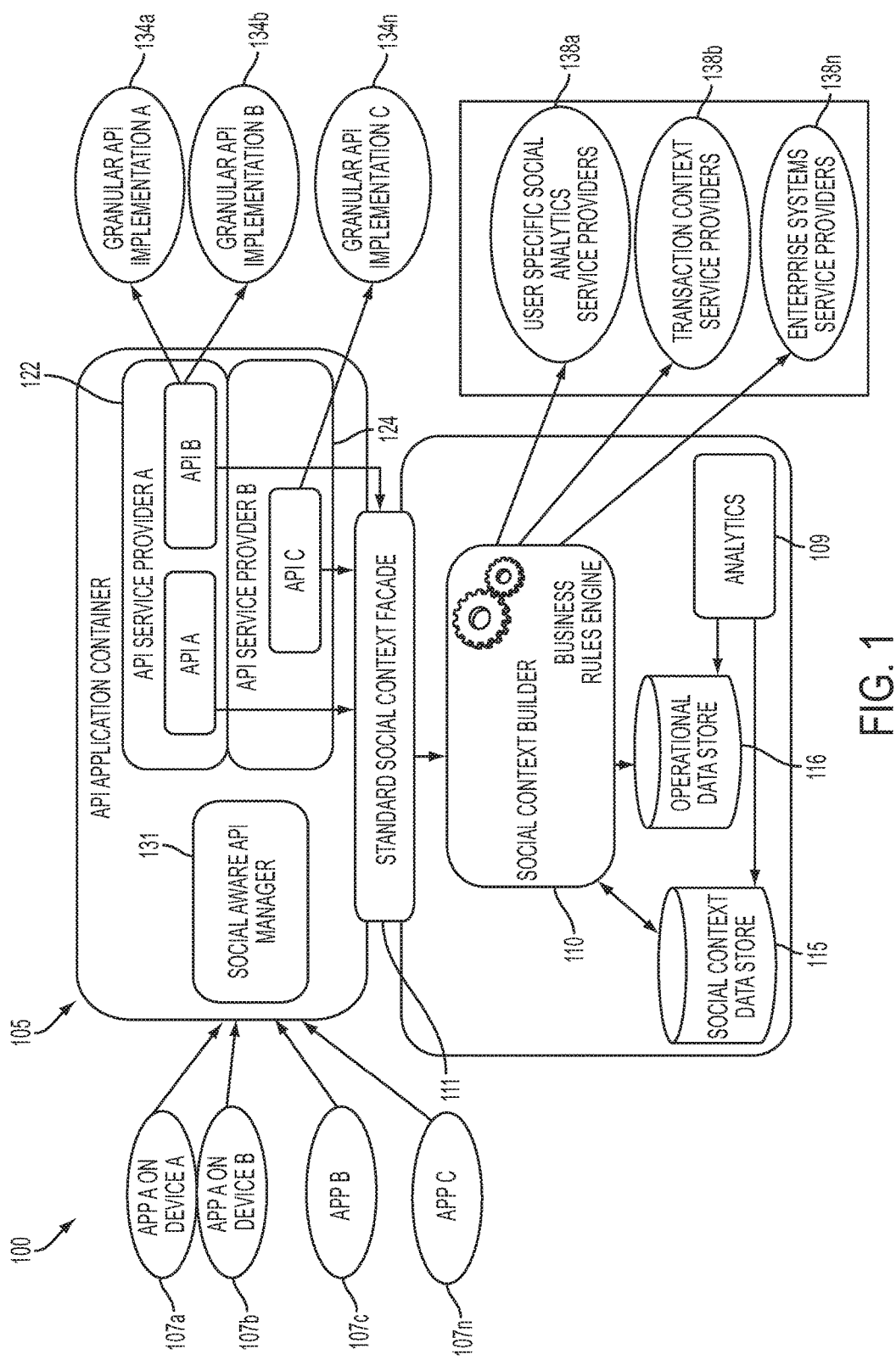
FIG. 1 illustrates a system for associating aggregated social content with an application programming interface (API) service container to differentiate each output, in accordance with embodiments of the present invention.

FIG. 1 illustrates a system 100 for associating aggregated social content with an application programming interface (API) service container 105 to differentiate each output, in accordance with embodiments of the present invention. Current application container systems do not include built in intelligence for automatically identifying social context associated with a requested service. The social context may be set by a service consumer's calling application or handled by a service provider. Additional significant development effort is required to enable social context either at a calling application or a service provider application. Changes to the social context may affect a consumer and provider application (e.g., an addition of a new parameter to the social context). Therefore, system 100 provides the ability to provide social context associated with an end user profile and associated activities to an API application container 105 of an API provider (e.g., API service providers 122 and 124) by automatically and asynchronously aggregating the aforementioned information from regular business service or social media API calls. System 100 additionally provides a known end point for the API application container 105 to retrieve a notification of changes. An API service provider may leverage social context defined in a standardized format to provide a differentiated and relevant service experience to a caller. Likewise, standardization of parameters may abstract developers from data mapping efforts. A social context builder may use configurable adaptors to aggregate user profile data from different end points and invoke relevant analytics to identify additional parameters.

System 100 comprises API application container 105 connected between applications 107a . . . 107n and API implementations 134a . . . 134n and service providers 138a . . . 138n. API application container 105 comprises an API manager 131 and API providers 122 and 124 connected through a social context façade 111 to a social context builder 110, an analytics component 109, and databases 115 and 116. API service providers 122 and 124 receive requests from (service consumer) applications 107a . . . 107n. API service providers 122 and 124 pass user and additional request header information to social context builder component 110. Social context builder component 110 builds social context for an API call (from service providers 138a . . . 138n) by leveraging multiple service provider services. Service providers 138a . . . 138n may comprise user specific service providers 138a, transaction context service providers 138b, and enterprise systems service providers 138n. User specific social analytics service providers 138a are enabled to retrieve attributes such as, inter alia, social influence, interests, mobility patterns, mood, etc. Transaction context service providers 138b are enabled to retrieve attributes such as, inter alia, geo-location, browsing patterns, etc. (e.g., geocoding APIs, IP address-Geo-location APIs, spring metrics, etc.) from existing internal enterprise systems to retrieve relationships with existing customer bases or any additional previous interactions. Established social context is forwarded along with a service request to an API Service provider. The API service provider uses the extra social context information to provide differentiated service responses based on specific social context parameters. Sample routines for providing differentiated responses listed as follows:

Is User an Influencer( )
Is User in a bad Mood( )
Is User near a company store( )
Is User Lurking( )

Social context generated during the aforementioned transaction is stored in a data store (e.g., databases 115 and 116) for leveraging for subsequent service invocations. A profile is constantly updated using background batch programs. Social aware API manager 131 manages the aforementioned processes. Analytics component 109 is enabled to analyze the effectiveness of the social context attributes in differentiated responses provided.

The following implementation example describes an online user requesting access to a business service. The process is initiated transmitting service invocation details (in combination with header information including a date/time, user credentials, an ip address, location information, etc.) to a service provider. The header information comprises data for establishing social context of a transaction derived automatically by the API application container 105. The data establishes the social context either by deriving with respect to an algorithm or by outsourcing the data to provider services. For example, the following characteristics constitute a social context of a transaction:

1. If location information is not provided, a lookup with respect to a service (i.e., including translated physical addresses or ip-addresses to a geo-location) may be established so that location context may be established.
2. Browsing patterns of a user may be derived by looking up a big data analytics vendor service (e.g., springmetrics)
3. A user's mobility patterns may be tracked by analyzing geo-tagged interactions or services such as foursquare check-ins.
4. Social klout may be acquired via a service such as Klout.com.
5. Social relations (of importance to the service provider) may be derived by checking a user's relations against internal/external data sources.
6. Special occasions with respect to a user.
7. A social mood of a user may be derived by analyzing a most recent social media activity of the user if an associated user id comprises a social media id or linked federated credentials with a social media id.

8. Existing relationships associated with the user may be derived by looking up a service provider's internal CRM systems When social context is established by API application container 105, the social context may be used by a consuming application for providing differentiated and relevant service responses to a caller. For example:
1. A location aware service response may be presented (i.e., rather than a generic response).
2. Based on a browsing pattern, different discount schemes may be provided in the social context with respect to a retail service (e.g., system 100 may differentiate between a lurking user and a more serious buyer).
3. Based on a mobility pattern, location aware service responses may be presented based on a user's address and on the user's frequently visited locations.
4. Additional priority/importance may be presented to a person with more social influence.
5. Relevant responses based on a user's social interests.
6. Positive interactions with a relation of the user may be highlighted as part of a service response.
7. Differentiated responses may be presented based on a mood of the user.
8. Preferential treatment may be given to a user based on a CRM view of the user in enterprise systems.

Figure 2A:
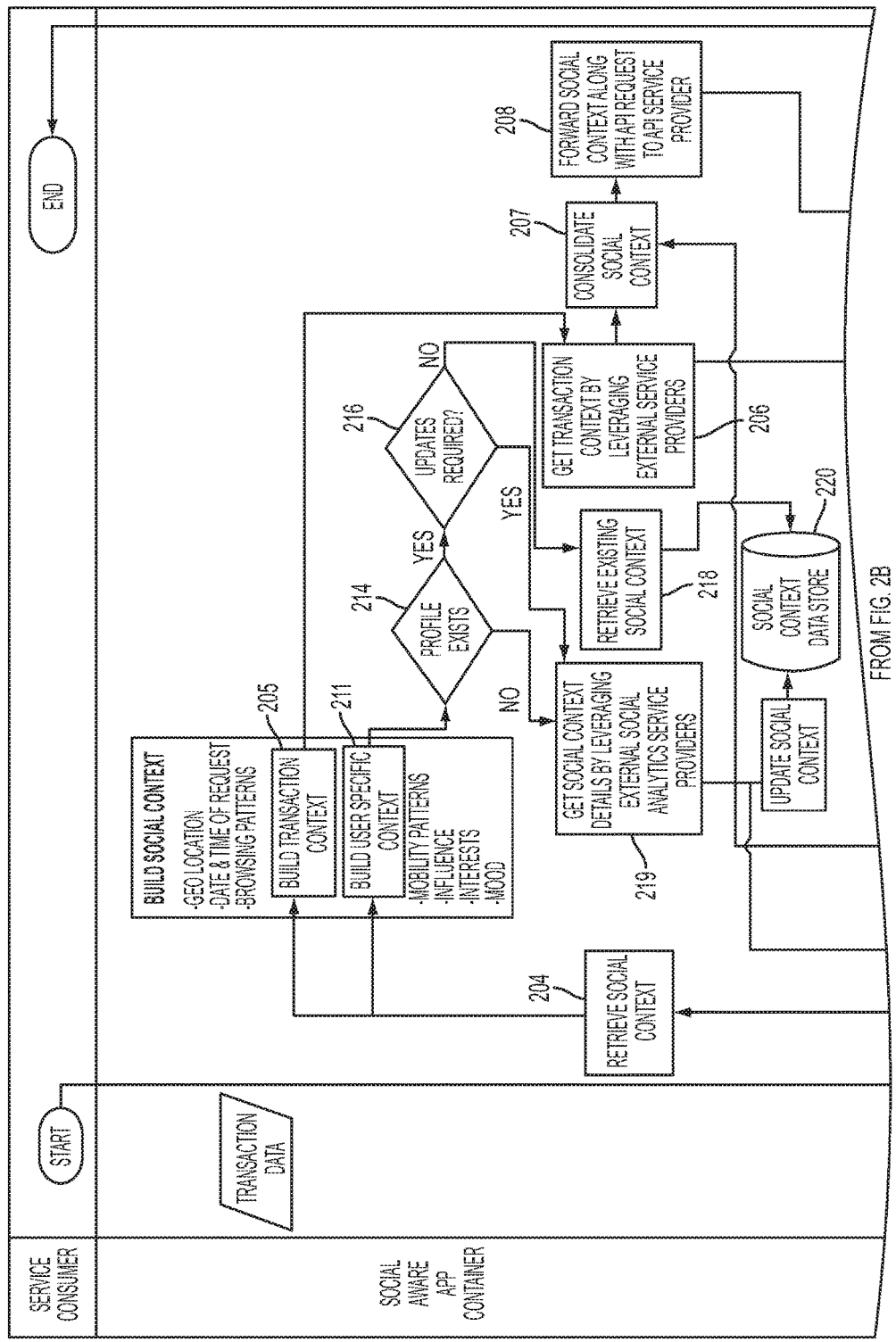
FIGS. 2A and 2B, in combination, illustrate a flowchart detailing a process enabled by the system of FIG. 1 for associating aggregated social content with an API service container to differentiate each output, in accordance with embodiments of the present invention.
Figure 2B:
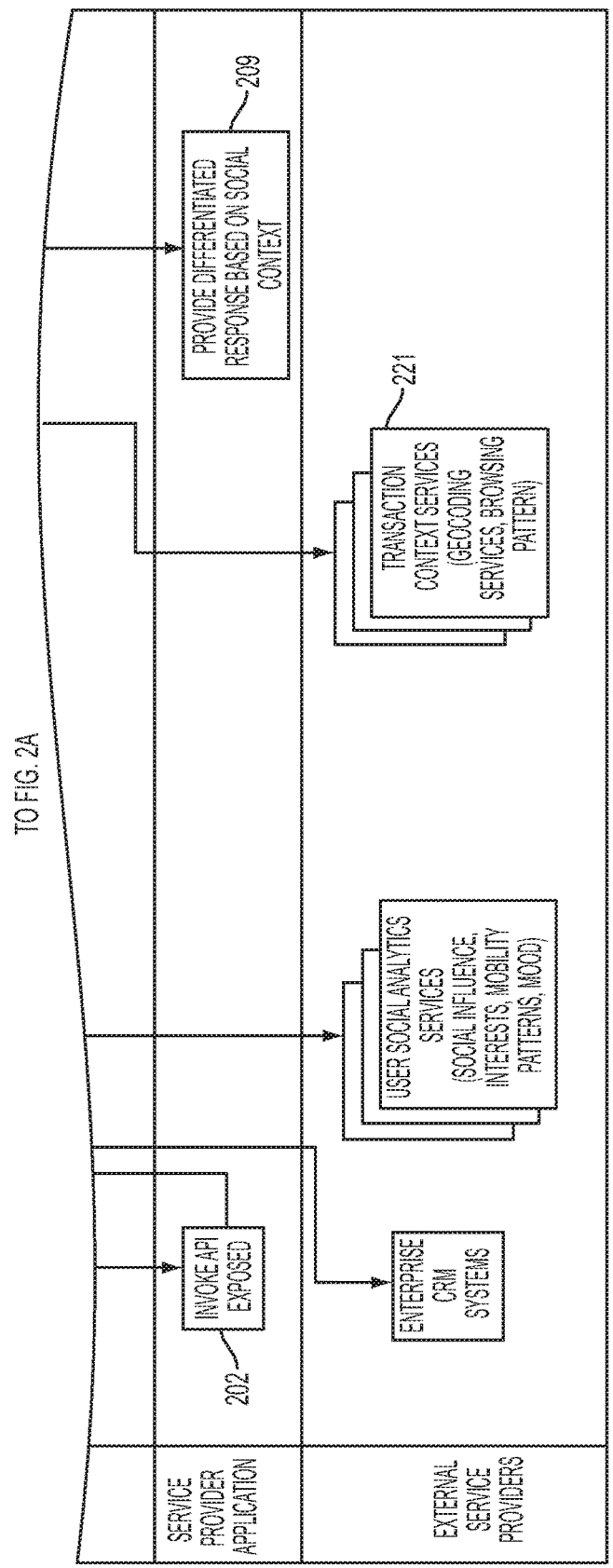

FIGS. 2A and 2B, in combination, illustrate a flowchart detailing a process enabled by system 100 of FIG. 1 for associating aggregated social content with an API service container to differentiate each output, in accordance with embodiments of the present invention. Each of the steps in the algorithm of FIGS. 2A and 2B may be enabled and executed in any order by a computer processor executing computer code. In step 202, consumers invoke APIs exposed from the API service container via applications running on end user devices. The invocation includes collecting (by the applications) transaction specific data from the applications (e.g., ip address, geo location, user credentials, etc.) and transmitting the transaction specific data to the API service container. The transaction specific data may include, inter alia, any data describing or qualifying a user request. In step 204, a social context retrieval sub-process is executed. The executed sub-process results in the generation of an entire social context of the current invocation. The executed sub-process comprises a transaction specific context generation process in step 205 and a user specific generation process in step 211 described as follows:

The transaction specific context generation process comprises adding relevant information of interest for a specified transaction (e.g., geo-location, data & time of invocation, browsing history/pattern, etc.). For example, a transaction may include an online retail purchase. Additional context information (e.g., associated with a date/time, holiday, location, etc.) may be added to the specified transaction. Transaction specific context generation process 205 enables an API application container (e.g., API application container 105 of FIG. 1) to invoke a pre-configured set of provider services in step 206 and assimilate associated information to generate overall transaction specific context in step 221. For example, provider services may include, inter alia, geocoding services, IP address geocoding services, browsing pattern intelligence services, etc.

The user specific context generation process comprises adding additional social information associated with a person participating in a transaction (e.g., social clout, social mood, social interests, a mobility pattern (e.g., frequent check-ins at a mall), etc.). The process is initiated in step 214 by an API service container determining if a specified user social context is present within the API service container system. If the specified user social context is present within the API service container system then in step 216, the API service container will determine if the specified user social context is current (up to date). If the API service container determines that the specified user social context is current then the API service container retrieves, in step 218, an existing up-to-date user social context profile from a cached data store 220 and returns the profile to a context builder. If the API service container determines that the specified user social context is not current then in step 219, the API service container invokes a pre-configured set of user social analytics (i.e., associated with service providers) to generate social context for the user. For example, provider services may include, inter alia, social influence services, social interests, mobility patterns, etc. Additionally, the API service container may invoke enterprise services to add additional business specific context to the specified user. For example, the user may be a 'Platinum' user or the user may be 'friends' with an existing customer. In step 207, social context is consolidated by combining user specific social context and transaction specific context. In step 208, the social context and the API request are forwarded to an API service provider API application. In step 209, a service provider application provides social context sensitive differentiated and an associated relevant response to the API service container. For example:
1. A location aware service response may be presented.
2. Based on a browsing pattern, differing discount schemes may be provided in the context for a retail service (e.g., a lurking user may be differentiated from a serious buyer).
3. Based on a mobility pattern, location aware service responses may be presented based on a user's address and a user's frequently visited locations.
4. Additional priority/importance may be associated with a person associated with more social influence.
5. Relevant responses may be based on user's social interests.
6. Positive interactions with a relation of the user may be highlighted as part of a service response.
7. Differentiated responses may be presented based on a mood of the user.
8. Preferential treatment may be presented to a user based on the CRM view of the user in enterprise systems.

Figure 3:
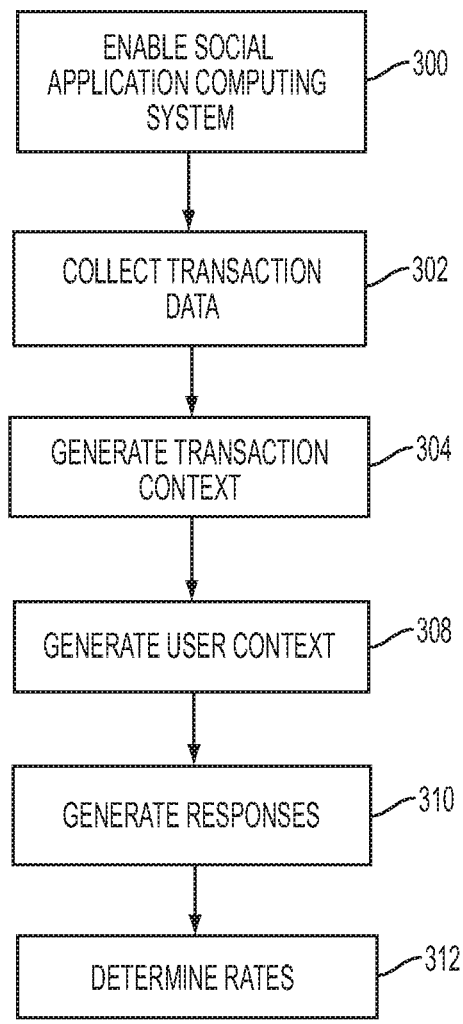
FIG. 3 illustrates an algorithm detailing a process flow enabled by the system of FIG. 1 for providing social context for a service provider application, in accordance with embodiments of the present invention.

FIG. 3 illustrates an algorithm detailing a process flow enabled by system 100 of FIG. 1 for providing social context for a service provider application, in accordance with embodiments of the present invention. Each of the steps in the algorithm of FIG. 3 may be enabled and executed in any order by a computer processor executing computer code. In step 300, a computer processor of a social application container computer system is enabled from an end user device via an application program interface (API) (i.e., executing in the social application container computer system) invoked by an application running on the end user device. In step 302, transaction data is collected from the end user device via the application and the API. The transaction data describes a transaction request of a user of the end user device. In step 304, transaction specific context is generated based on the transaction data. The process for generating the transaction specific context includes: invoking a preconfigured set of external provider services; and assimilating responses of said preconfigured set of external provider services into said transaction specific context. In step 308, user specific context is generated based on user data present in the transaction data. Generating the user specific context includes:

1. Invoking a preconfigured set of external social analytics provider services.
2. Assimilating responses of the preconfigured set of external social analytics provider services into the user specific context.
3. Storing retrieved user specific context for future retrieval during an invocation process of the API by the user.
4. Combining the user specific context with the transaction specific context. Results of the combining process generate social context data associated with the invocation process.
5. Transmitting the social context to a social application container of a provider of the API.

In step 310, differentiated responses are generated (by executing an application of the provider of the API) based on the social context. Generating the differentiated responses is independent from a process for maintaining and developing logic for collecting and generating additional social context for every additional API executing in the social application container. In step 312, differing discount rates (associated with the social application container computer system) are determined based on the differentiated responses.

Figure 4:
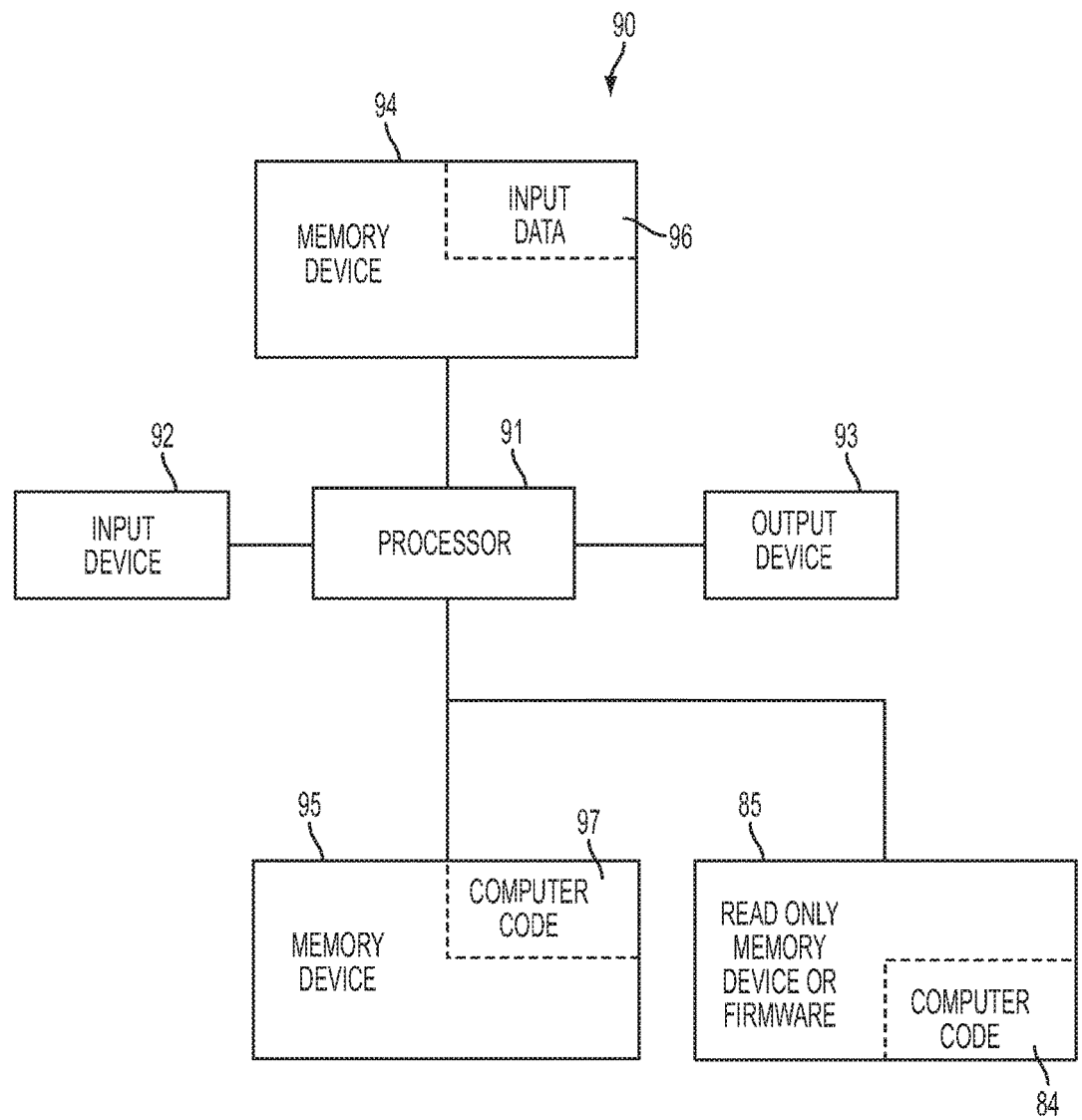
FIG. 4 illustrates a computer system for providing social context for a service provider application, in accordance with embodiments of the present invention.

FIG. 4 illustrates a computer system 90 (e.g., API application computing system of FIG. 1) for providing social context for a service provider application, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIGS. 2A, 2B, and 3) for providing social context for a service provider application. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2A, 2B, and 3) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to provide social context for a service provider application. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for providing social context for a service provider application. In another embodiment, the invention provides a business method that performs the process steps of the invention on a subscription, advertising, and/or fee basis. That is, a service supplier, such as a Solution Integrator, could offer to provide social context for a service provider application. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A service delivery method comprising:
collecting, by a computer processor of a social application container computer system from an end user device via a header of said application and an application program interface (API) executing in the said social application container computer system invoked by an application running on the end user device, transaction data describing a transaction request of a user of said end user device, wherein said transaction data consists of an IP address of said end user device, a geo-location of said user, and credentials associated with said user;
generating, by said computer processor based on said transaction data, transaction specific context, wherein said generating said transaction specific context comprises:
invoking a preconfigured set of external provider services; and
assimilating responses of said preconfigured set of external provider services into said transaction specific context;
generating, by said computer processor based on user data present in said transaction data, user specific context, wherein said generating said user specific context comprises:
invoking a preconfigured set of external social analytics provider services;

assimilating responses of said preconfigured set of external social analytics provider services into said user specific context; and storing retrieved user specific context for future retrieval during an invocation process of said API by said user; and automatically and asynchronously combining said user specific context with said transaction specific context, wherein results of said automatically and asynchronously combining generates social context data associated with said invocation process; and automatically maintaining and developing, by said computer processor, logic based code for collecting and generating additional social context for every additional API executing in a social application container of a provider of said API, wherein said social application container comprises said social context; and generating, by said computer processor executing an application of said provider of said API, differentiated responses based on said social context, wherein said generating said differentiated responses is independent from said maintaining and developing said logic based code.

2. The method of claim 1, further comprising:

determining, by said computer processor based on said differentiated responses, differing discount rates associated with said social application container computer system.

3. The method of claim 2, wherein said differentiated responses comprise responses selected from the group consisting of location aware services including social locations frequented by said user.

4. The method of claim 2, wherein said differing discount rates are determined based on social klout/browsing behavior, highlighted positive interactions associated with relations of said user, and preferential treatment based on a CRM view of said user.

5. The method of claim 1, wherein said external provider services comprise services selected form the group consisting of geo-coding services, IP address geo-coding services, and browsing pattern intelligent services, mobility pattern tracking services, social klout analysis services, and social relation, special occasion, and social sentiment mood tracking services.

6. The method of claim 1, further comprising:

providing at least one support service for at least one of creating, integrating, hosting, maintaining, and deploying computer-readable code in the computing system, said code being executed by the computer processor to implement: said collecting, said generating said transaction specific content, and said generating said user specific content.

7. A social application container computing system comprising a computer processor coupled to a computer-readable memory unit, said memory unit comprising instructions that when executed by the computer processor implements a service delivery method comprising:

collecting, by said computer processor from an end user device via a header of said application and an application program interface (API) executing in the said social application container computer system invoked by an application running on the end user device, transaction data describing a transaction request of a user of said end user device, wherein said transaction data consists of an IP address of said end user device, a geo-location of said user, and credentials associated with said user;

generating, by said computer processor based on said transaction data, transaction specific context, wherein said generating said transaction specific context comprises:

invoking a preconfigured set of external provider services; and assimilating responses of said preconfigured set of external provider services into said transaction specific context;

generating, by said computer processor based on user data present in said transaction data, user specific context, wherein said generating said user specific context comprises:

invoking a preconfigured set of external social analytics provider services;

assimilating responses of said preconfigured set of external social analytics provider services into said user specific context; and storing retrieved user specific context for future retrieval during an invocation process of said API by said user; and automatically and asynchronously combining said user specific context with said transaction specific context, wherein results of said automatically and asynchronously combining generates social context data associated with said invocation process; and automatically maintaining and developing, by said computer processor, logic based code for collecting and generating additional social context for every additional API executing in a social application container of a provider of said API, wherein said social application container comprises said social context; and generating, by said computer processor executing an application of said provider of said API, differentiated responses based on said social context, wherein said generating said differentiated responses is independent from said maintaining and developing said logic based code.

8. The social application container computing system of claim 7, wherein said method further comprises:

determining, by said computer processor based on said differentiated responses, differing discount rates associated with said social application container computer system.

9. The social application container computing system of claim 8, wherein said differentiated responses comprise responses selected from the group consisting of location aware services including social locations frequented by said user.

10. The social application container computing system of claim 8, wherein said differing discount rates are determined based on social klout/browsing behavior, highlighted positive interactions associated with relations of said user, and preferential treatment based on a CRM view of said user.

11. The social application container computing system of claim 7, wherein said external provider services comprise services selected form the group consisting of geo-coding services, IP address geo-coding services, and browsing pattern intelligent services, mobility pattern tracking services, social klout analysis services, and social relation, special occasion, and social sentiment mood tracking services.

12. A computer program product, comprising a computer readable hardware storage device storing a computer readable program code, said computer readable program code comprising an algorithm that when executed by a computer processor of a social application container computing system implements a service delivery method, said method comprising:

collecting, by said computer processor from an end user device via a header of said application and an application program interface (API) executing in the said social application container computer system invoked by an application running on the end user device, transaction data describing a transaction request of a user of said end user device, wherein said transaction data consists of an IP address of said end user device, a geo-location of said user, and credentials associated with said user;

generating, by said computer processor based on said transaction data, transaction specific context, wherein said generating said transaction specific context comprises:
 invoking a preconfigured set of external provider services; and
 assimilating responses of said preconfigured set of external provider services into said transaction specific context;

generating, by said computer processor based on user data present in said transaction data, user specific context, wherein said generating said user specific context comprises:
 invoking a preconfigured set of external social analytics provider services;
 assimilating responses of said preconfigured set of external social analytics provider services into said user specific context; and
 storing retrieved user specific context for future retrieval during an invocation process of said API by said user; and automatically and asynchronously combining said user specific context with said transaction specific context, wherein results of said automatically and asynchronously combining generates social context data associated with said invocation process; and automatically maintaining and developing, by said computer processor, logic based code for collecting and generating additional social context for every additional API executing in a social application container of a provider of said API, wherein said social application container comprises said social context; and generating, by said computer processor executing an application of said provider of said API, differentiated responses based on said social context, wherein said generating said differentiated responses is independent from said maintaining and developing said logic based code.

13. The computer program product of claim 12, wherein said method further comprises:
determining, by said computer processor based on said differentiated responses, differing discount rates associated with said social application container computer system.

14. The computer program product of claim 13, wherein said differentiated responses comprise responses selected from the group consisting of location aware services including social locations frequented by said user.

15. The computer program product of claim 13, wherein said differing discount rates are determined based on social klout/browsing behavior, highlighted positive interactions associated with relations of said user, and preferential treatment based on a CRM view of said user.

* * * * *